United States Patent
Kato et al.

(10) Patent No.: US 11,642,989 B2
(45) Date of Patent: May 9, 2023

(54) TILT STRUCTURE FOR CONSOLE

(71) Applicant: STARTING INDUSTRIAL CO., LTD., Tokyo (JP)

(72) Inventors: Hiroki Kato, Tokyo (JP); Ami Ishimizu, Tokyo (JP)

(73) Assignee: STARTING INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 17/773,934

(22) PCT Filed: Dec. 2, 2020

(86) PCT No.: PCT/JP2020/044873
§ 371 (c)(1),
(2) Date: May 3, 2022

(87) PCT Pub. No.: WO2021/131558
PCT Pub. Date: Jul. 1, 2021

(65) Prior Publication Data
US 2022/0410766 A1     Dec. 29, 2022

(30) Foreign Application Priority Data

Dec. 26, 2019   (JP) .............................. JP2019-236074

(51) Int. Cl.
*B60N 2/12*     (2006.01)
*B62D 1/12*     (2006.01)

(52) U.S. Cl.
CPC ................ *B60N 2/123* (2013.01); *B62D 1/12* (2013.01)

(58) Field of Classification Search
None
See application file for complete search history.

(56) References Cited

U.S. PATENT DOCUMENTS 3,761,045 A * 9/1973 Sturhan .................. B60N 2/505
                                                                297/307
4,659,052 A * 4/1987 Nagata ................... B60N 2/502
                                                                248/575

FOREIGN PATENT DOCUMENTS

| DE | 102018221340 A1 * | 6/2020 | .......... B60N 2/0248 |
| GB | 2241885 A * | 9/1991 | ............. B60N 2/502 |
| JP | H07-19058 U | 4/1995 | |
| JP | H09-291564 A | 11/1997 | |
| JP | 4535457 B2 | 9/2010 | |
| JP | 4555268 B2 | 9/2010 | |

OTHER PUBLICATIONS

Feb. 22, 2021 International Search Report issued in International Patent Application No. PCT/JP2020/044873.
Feb. 22, 2021 Written Opinion issued in International Patent Application No. PCT/JP2020/044873.

\* cited by examiner

*Primary Examiner* — Sarah B McPartlin
(74) *Attorney, Agent, or Firm* — Oliff PLC

(57) ABSTRACT

A tilt structure to be provided allows the tilt of a console to be changed through simple motion and has a simple configuration. A link mechanism (a mechanism similar to a slider crank mechanism) composed of three turning pairs and one sliding pair is formed using a first frame 20, a second frame 25, a slider 37, and a connection member 30. The tilt structure includes a control member 40 or 47 for fixing or unfixing the tilt of the second frame 25. The control member 40 or 47 is provided controllably in order to lock or unlock motion of the link mechanism.

3 Claims, 11 Drawing Sheets

(a)

(b)

(a)

(b)

(a)

(b)

(a)

(b)

(a)

(b)

(c)

TILT STRUCTURE FOR CONSOLE

TECHNICAL FIELD

This invention relates to a tilt structure to change the tilt of a console arranged at a lateral part of a seat.

BACKGROUND ART

A construction machine such as a hydraulic shovel has a driver seat provided in a cabin, and a platform for getting on and off the driver seat is provided on either a right side or a left side. A console is arranged at a lateral part of the seat and the console includes an operation lever for steering provided in a protruding position. In some cases, a tilt structure to change the tilt of the console is provided for facilitating getting on and off the seat or adjusting the height of the operation lever at the time of seating in the seat.

For example, Patent Literature 1 discloses a configuration in which two locking pins extending one above the other and parallel to each other are placed at a tilt bracket, the upper locking pin is fixed to a second frame, and the lower locking pin is locked in a tooth groove part of a first frame. This configuration allows the tilt of the second frame to be changed by changing a position at which the lower locking pin is engaged with the tooth groove part of the first frame.

PRIOR ART LITERATURE

Patent Literature

Patent Literature 1: Japanese Utility Model Application Publication No. 7-19058

SUMMARY OF INVENTION

Problem to be Solved by Invention

However, the above-described configuration of Patent Literature 1 has a need to rotate the tilt bracket arranged inside a console for changing the tilt of the second frame. In response to this, to allow the tilt of the console to be changed from outside, a mechanism for rotating the tilt bracket is required to cause a problem of complicating the configuration.

Thus, the present invention is intended to provide a tilt structure allowing the tilt of a console to be changed through simple motion and having a simple configuration.

Means of Solving Problem

To solve the above-described problem, the present invention is intended for a tilt structure to change the tilt of a console arranged at a lateral part of a seat, comprising: a first frame arranged at the lateral part of the seat; a second frame attached to an upper portion of the first frame in such a manner as to be swingable upward and downward; a slider provided in such a manner as to be slidable backward and forward relative to the first frame; a connection member connected in a pivotable manner to the second frame and the slider; and a control member for fixing or unfixing the tilt of the second frame, wherein a link mechanism composed of three turning pairs and one sliding pair is formed using the second frame, the first frame, the slider, and the connection member, and the control member is provided controllably in order to lock or unlock motion of the link mechanism.

Advantageous Effects of Invention

According to the present invention described above, the link mechanism (a mechanism similar to a slider crank mechanism) composed of three turning pairs and one sliding pair is formed using the first frame, the second frame, the slider, and the connection member. Thus, this link mechanism can be used for changing the tilt of the second frame. Furthermore, switch can be made between whether to lock motion of the link mechanism and whether to unlock the motion only by controlling the control member. Thus, an intention to change the tilt of the second frame can be achieved by controlling the control member to unlock the link mechanism, and an intention to fix the tilt of the second frame can be achieved by controlling the control member to lock motion of the link mechanism. In this way, the tilt of the console can be changed through simple motion and the configuration is simplified.

EMBODIMENTS FOR CARRYING OUT INVENTION (First Embodiment)

A first embodiment of the present invention will be described by referring to FIGS. 1 to 7. In the following description, a horizontal frontward direction determined when an operator is seated in a seat 10 is called a "forward" direction, and a direction opposite the "forward" direction is called a "backward" direction. Furthermore, with the operator seated in the seat 10 and facing frontward, a left side viewed from the operator is called a "leftward" direction and a right side viewed from the operator is called a "rightward" direction.

Figure 1:
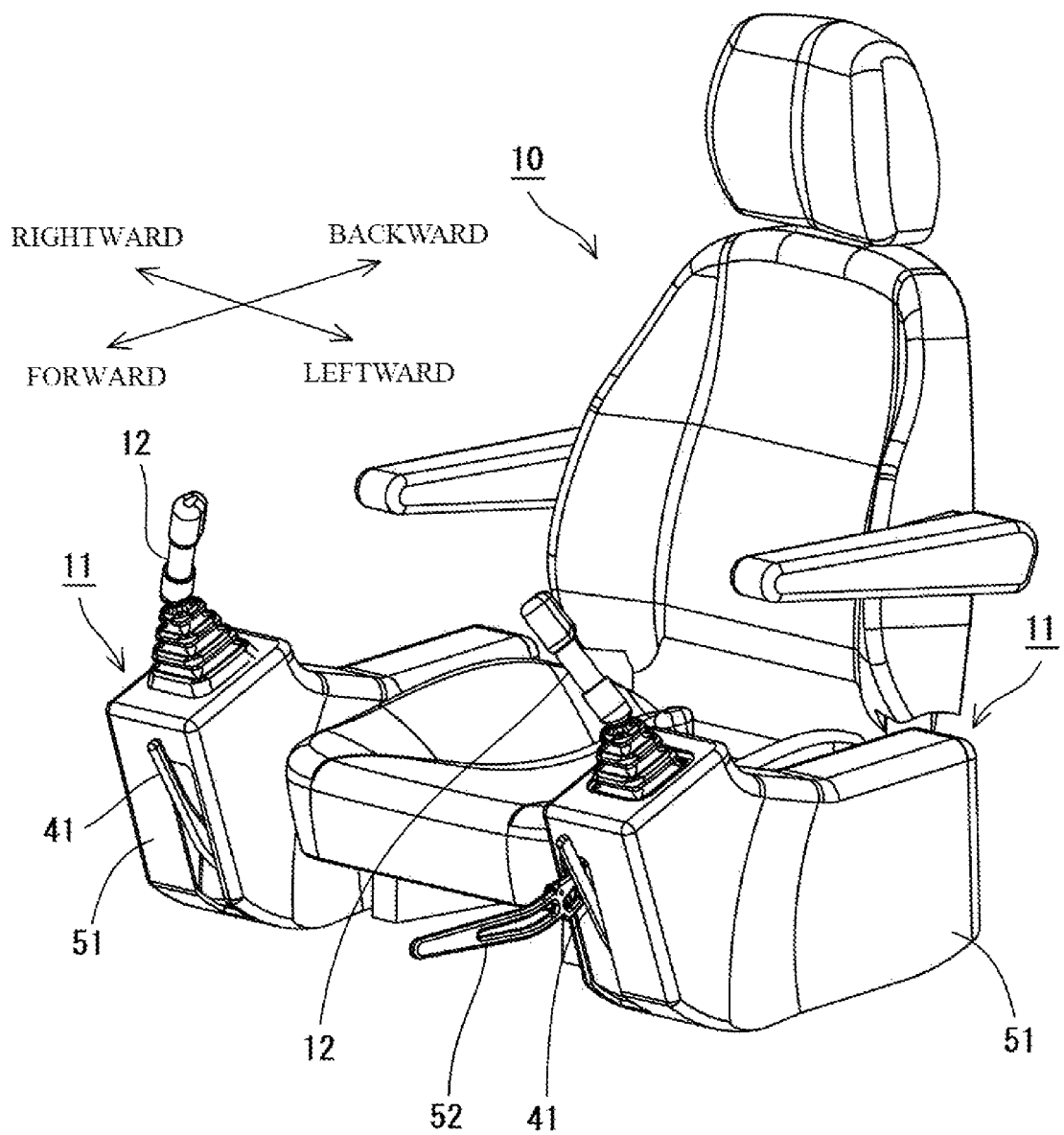
FIG. 1 is a perspective view showing a seat and a console according to a first embodiment.

A console 11 according to the present embodiment is used in a construction machine such as a hydraulic shovel. In such a construction machine, the seat 10 for an operator is provided in a cabin and the console 11 is arranged at each of both lateral parts of the seat 10. As shown in FIG. 1, the console 11 includes an operation lever 12 for steering provided in a protruding position. An operator controls the operation levers 12 with both hands to do steering such as rotation to the right and left or moving an arm.

While not particularly illustrated in the drawings, a platform for getting on and off the seat 10 is provided further at the back of the console 11 on one side as viewed from the seat 10 (in FIG. 1, the left console 11). Thus, passing in front of the console 11 is required for seating in the seat 10, and an area in front of the console 11 is a platform pathway to the seat 10. This console 11 on one side is provided with a gate lever 52 for interfering with getting on and off during steering. The gate lever 52 can be used for blocking the platform pathway during operation, and for opening the platform pathway during getting on and off by being flipped up.

Figure 2:
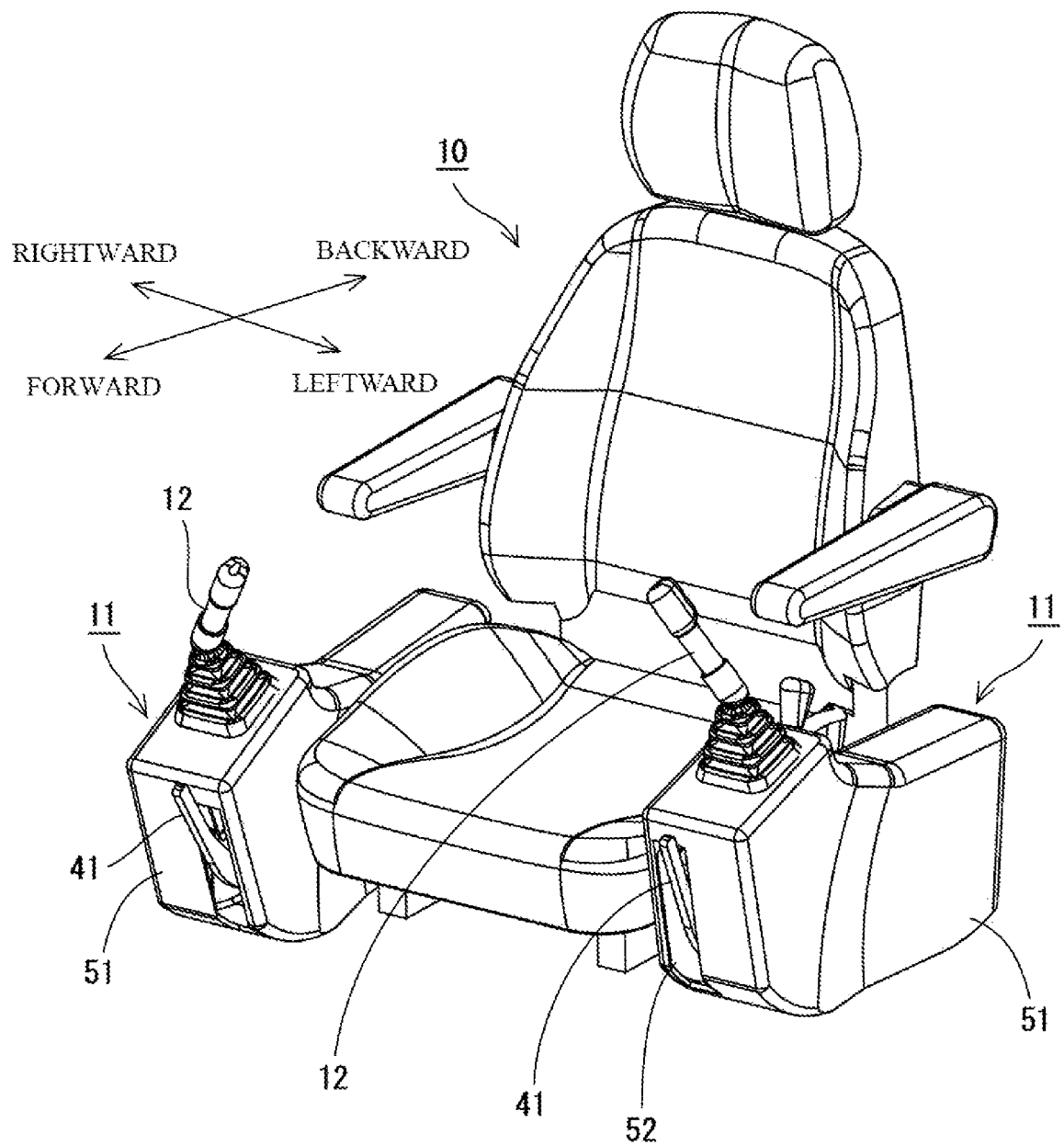
FIG. 2 is a perspective view showing the seat and the console while the tilt of the console is changed according to the first embodiment.

The console 11 according to the present embodiment includes a tilt structure to change the tilt of the console 11 for facilitating getting on and off the seat 10 or for adjusting the height of the operation lever 12 at the time of seating in the seat 10. For example, as shown in FIG. 2, the operation lever 12 can be moved to a higher position by changing the tilt of the console 11.

Figure 3:
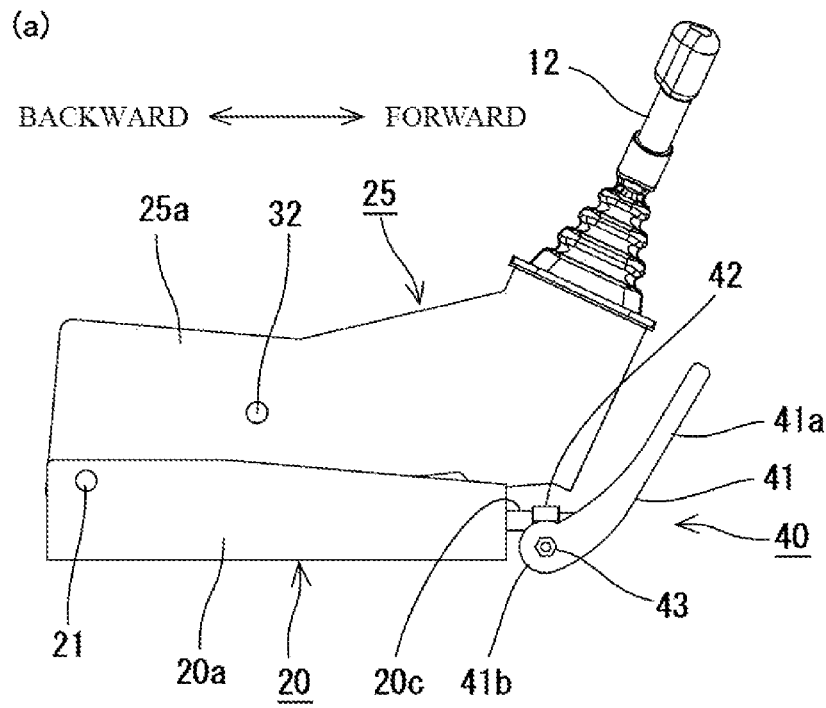
FIG. 3 is a side view of the console according to the first embodiment, and includes a view (a) showing a state where motion of a link mechanism is locked and a view (b) showing a state where the link mechanism is unlocked.
Figure 3:
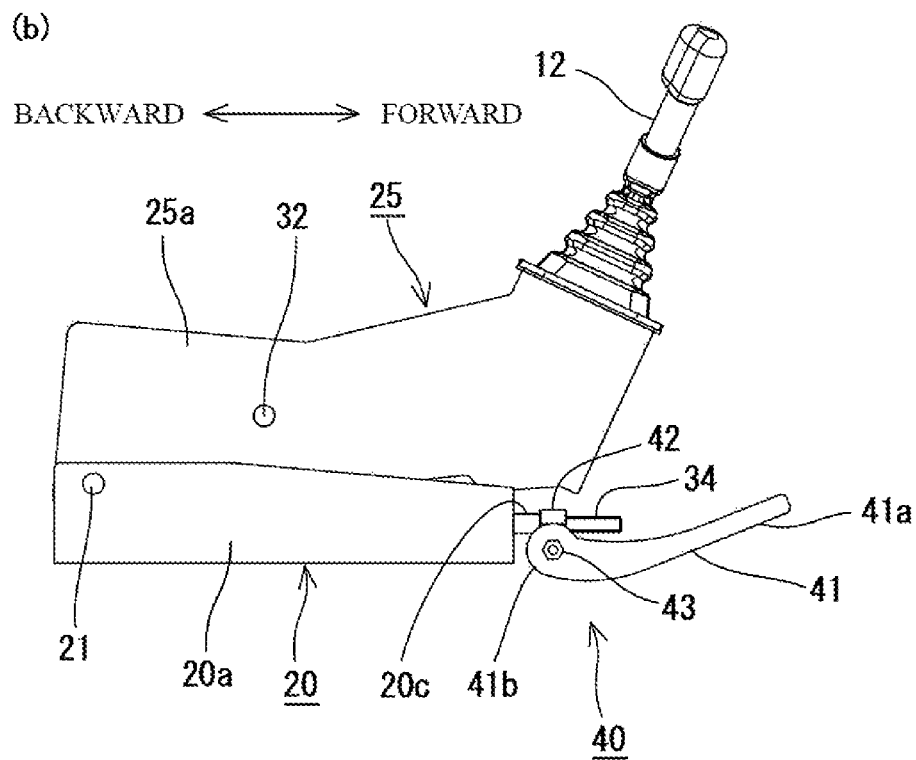
Figure 4:
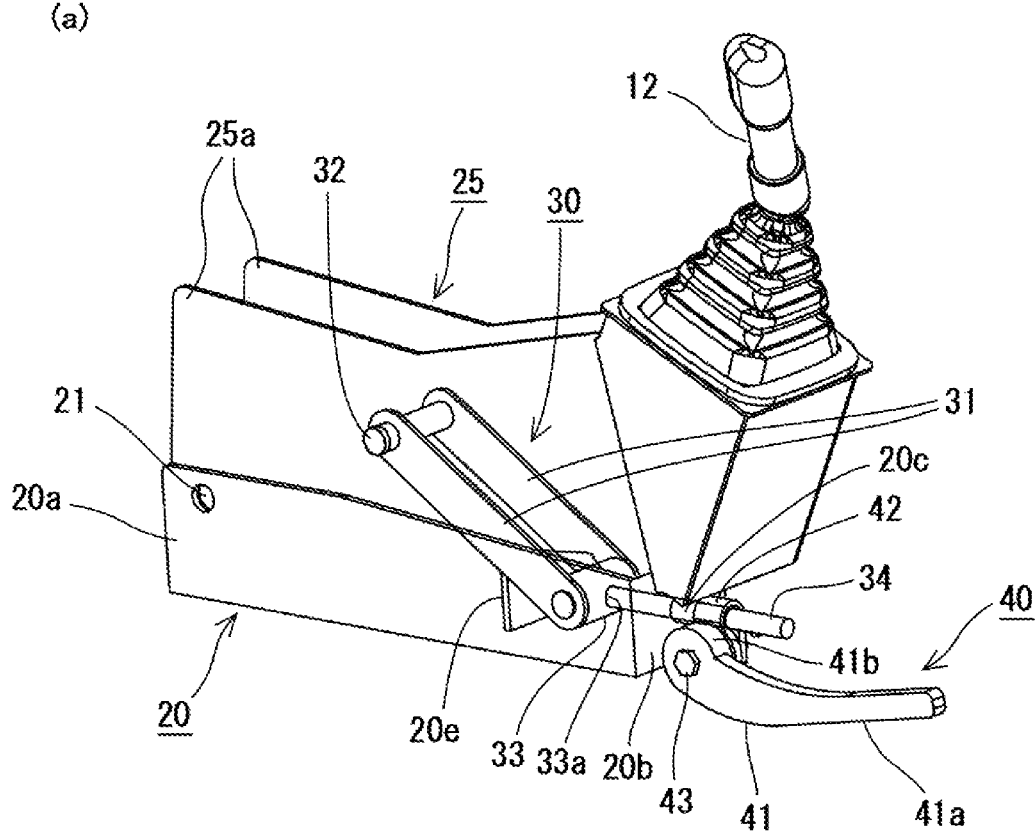
FIG. 4 includes a view (a) explaining the interior of the console and a plan view (b) showing a relationship between a first frame, a connection member, and a control member according to the first embodiment.
Figure 4:
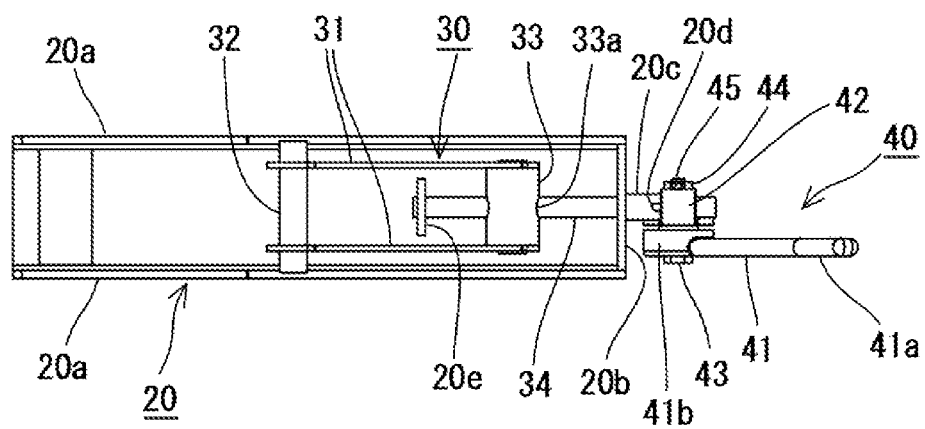

As shown in FIGS. 3 and 4, the console 11 includes a first frame 20, a second frame 25, a connection member 30, a slider 34, and a control member 40. As shown in FIG. 1, these members are accommodated in an interior covered with a frame cover 51 so as not to be exposed to the outside except a controllable part.

The first frame 20 is a frame fixed to a lateral part of the seat 10. The first frame 20 is arranged in such a manner as to face a floor surface. The first frame 20 according to the present embodiment includes side plate parts 20*a* in a pair formed of metallic plates, and a front plate part 20*b*. The side plate parts 20*a* in a pair form side surfaces of the first frame 20, and the front plate part 20*b* forms a front surface of the first frame 20.

The front plate part 20*b* has a front surface where a cylindrical sleeve 20*c* is formed in such a manner as to protrude forward. The sleeve 20*c* is to hold the slider 34 slidably described later and is formed in such a manner as to communicate with a hole formed at the front plate part 20*b*. Thus, the slider 34 penetrating the front plate part 20*h* is passed through the interior of the sleeve 20*c* to be held in such a manner as to be slidable backward and forward.

Figure 5:
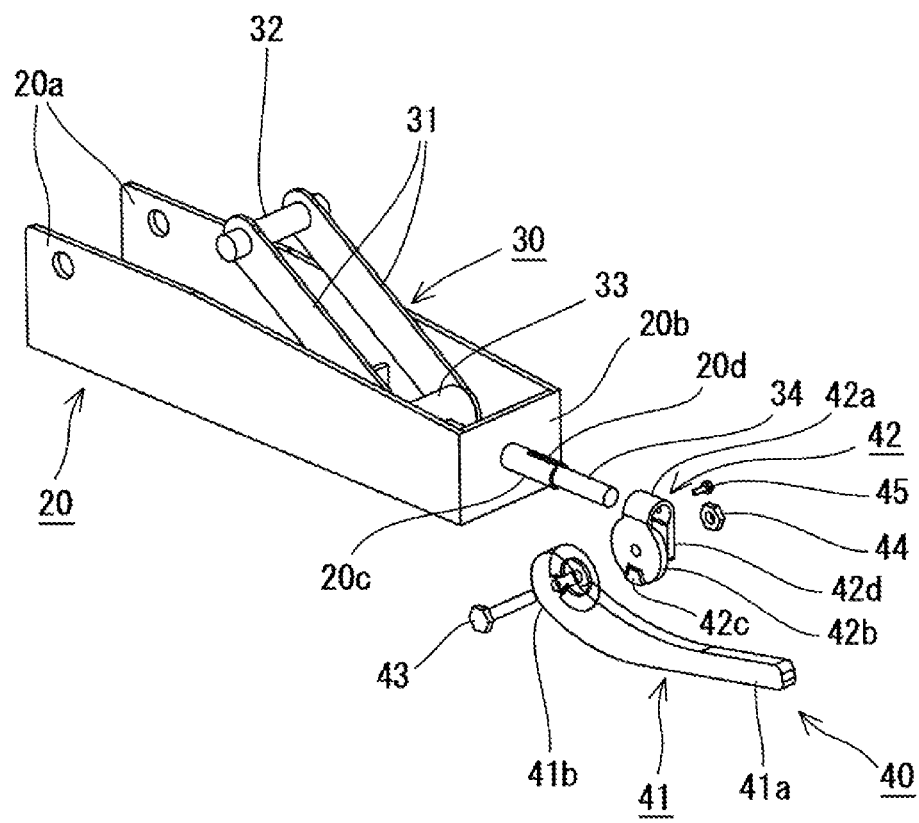
FIG. 5 is an exploded view showing a relationship between the first frame, the connection member, and the control member according to the first embodiment.
Figure 6:
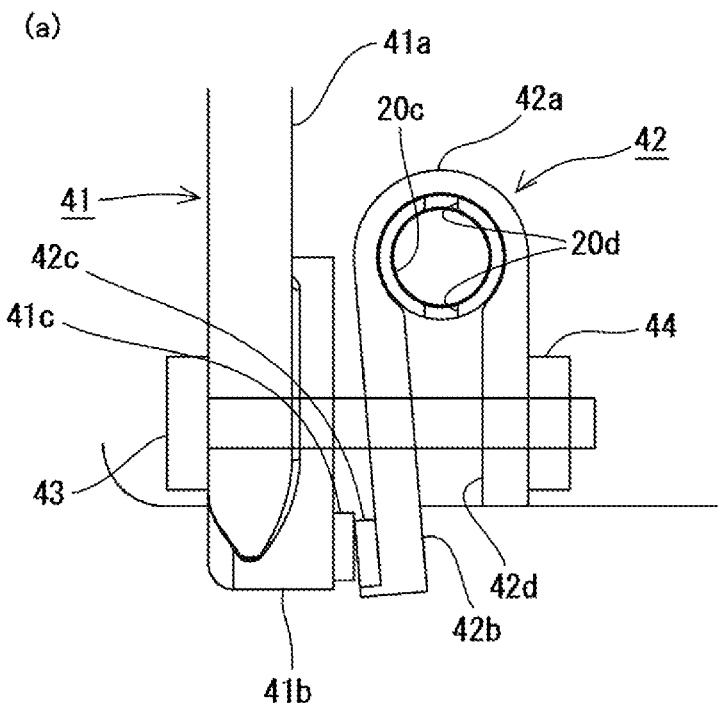
FIG. 6 is a view explaining motion of the control member according to the first embodiment, and includes a view (a) showing a state where motion of the link mechanism is locked and a view (b) showing a state where the link mechanism is unlocked.
Figure 6:
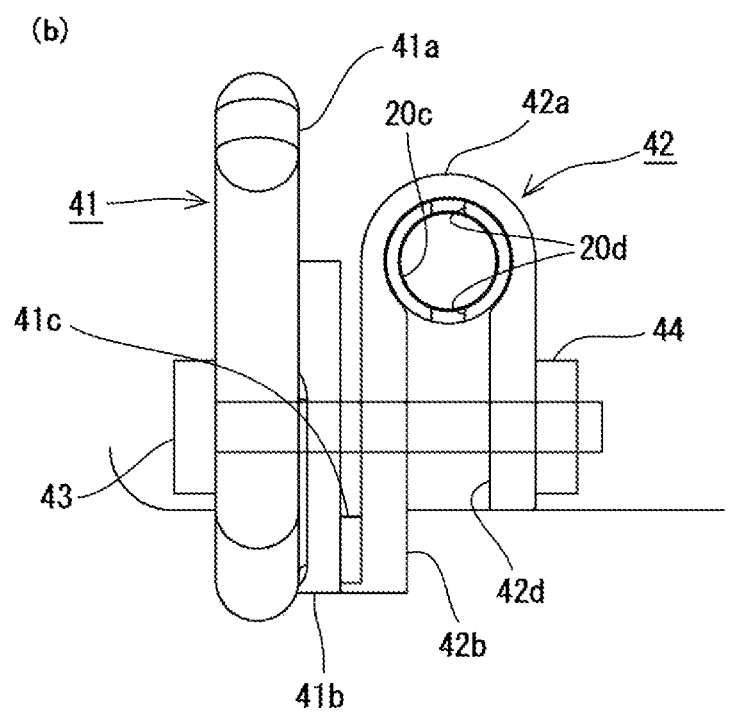

As shown in FIGS. 5, 6, etc., the sleeve 20*c* has an open end where a slit 20*d* is formed to extend in an axis direction from an edge of the end. The slit 20*d* is to deform the sleeve 20*c* easily in a diameter-reducing direction when the sleeve 20*c* is wrapped and held by a holding member 42 described later.

A support plate part 20*e* is provided inside the first frame 20 in such a manner as to face the front plate part 20*b*. The support plate part 20*e* is provided in an upright position backward of the front plate part 20*b* and parallel to the front plate part 20*b*. The support plate part 20*e* is given a hole for causing the slider 34 described later to penetrate therethrough, and works in cooperation with the above-described sleeve 20*c* to support the slider 34 in such a manner as to be slidable backward and forward.

The second frame 25 is a frame attached to an upper portion of the first frame 20 and arranged in such a manner as to be swingable upward and downward relative to the first frame 20. The second frame 25 according to the present embodiment includes side plate parts 25*a* in a pair formed of metallic plates. The side plate part 25*a* of the second frame 25 has a lower end portion arranged in such a manner as to overlap an upper end portion of the side plate part 20*a* of the first frame 20. A swinging shaft 21 for connecting the side plate parts 20*a* and 25*a* while allowing swinging motions of the side plate parts 20*a* and 25*a* is provided at a position where the side plate parts 20*a* and 25*a* overlap each other at their back portions.

As shown in FIG. 4, the connection member 30 is a member having an upper portion connected in a pivotable manner to the second frame 25, and a lower portion connected in a pivotable manner to the slider 34 (described later). The connection member 30 according to the present embodiment is configured by fixing plate-like link members 31 in a pair parallel to each other.

The connection member 30 is attached in the vicinity of its upper end portion to the second frame 25 in a pivotable manner through a pivotal shaft 32.

The connection member 30 is attached in the vicinity of its lower end portion to the slider 34 in a pivotable manner. More specifically, the connection member 30 includes a slider holder 33 provided in the vicinity of its lower end portion. The slider holder 33 is a cylindrical member rotatably supported by the link members 31 in a pair. The slider holder 33 is provided with an attachment hole 33*a* for attachment of the slider 34 described later. By fixing the slider 34 to the attachment hole 33*a* of the slider holder 33, the connection member 30 and the slider 34 are connected to each other in a pivotable manner.

The slider 34 is a member provided in such a manner as to be slidable backward and forward relative to the first frame 20. The slider 34 according to the present embodiment is a member like a round rod such as that shown in FIG. 4. The slider 34 penetrates the above-described attachment hole 33*a* to be fixed to the slider holder 33. Sliding motion of the slider 34 is supported by the sleeve 20*c* of the first frame 20 on the front side, and the sliding motion is supported by the support plate part 20*e* on the back side. The slider 34 has a front end protruding from an opening at the front end of the sleeve 20*c*. The sliding motion of the slider 34 changes the amount of the protrusion from the front end of the sleeve 20*c*.

In the tilt structure according to the present embodiment, the above-described four links (first frame 20, second frame 25, connection member 30, slider 34) form a link mechanism composed of three turning pairs and one sliding pair. Specifically, a joint between the first frame 20 and the second frame 25, a joint between the second frame 25 and the connection member 30, and a joint between the connection member 30 and the slider 34 correspond to the turning pairs. A joint between the first frame 20 and the slider 34 corresponds to the sliding pair. As a result, when the second frame 25 swings relative to the first frame 20 as a fixed link, the connection member 30 swings accordingly to cause the slider 34 to slide. More specifically, as shown in FIG. 7(a), when the second frame 25 swings downward, the connection member 30 swings downward to cause the slider 34 to slide forward. As shown in FIG. 7(b), when the second frame 25 swings upward, the connection member 30 swings upward to cause the slider 34 to slide backward.

The control member 40 is a member to fix or unfix the tilt of the second frame 25. The control member 40 is provided controllably in order to lock or unlock motion of the above-described link mechanism. More specifically, the control member 40 according to the present embodiment is configured to be placeable in a locked state of holding the slider 34 in such a manner as to make the slider 34 unmovable and an unlocked state of releasing he slider 34 to make the slider 34 movable.

As shown in FIG. 5, the control member 40 includes a lever 41, the holding member 42, a bolt 43, and a nut 44.

The lever 41 is a rod-like member attached in such a manner as to be rotatable about the bolt 43 described later. The lever 41 includes a rotary disk part 41b like a circular plate, and a grip 41a extending from the rotary disk part 41b. A hole for penetration of the bolt 43 is formed at the center of the rotary disk part 41b. As shown in FIG. 6, a protrusion 41c is formed at a part of a side surface of the rotary disk part 41b as viewed in a peripheral direction with respect to the bolt 43. The grip 41a is a handle used for rotating the lever 41 about the bolt 43. As shown in FIG. 1, etc., the grip 41a is provided in such a manner as to be controllable forward of the console 11.

As shown in FIG. 6, the holding member 42 is a member substantially U-shaped in a section. The holding member 42 is made of a material elastically deformable in a predetermined range and is made of metal, for example. The holding member 42 includes a semi-cylindrical strip section 42a, a first end section 42b extending continuously from one end portion of the strip section 42a, and a second end section 42d extending continuously from the other end portion of the strip section 42a.

As shown in FIG. 6. the strip section 42a has an inner peripheral surface substantially C-shaped in a section, and holds the sleeve 20c of the first frame 20 in such a manner as to wrap the sleeve 20c at this inner peripheral surface. As shown in FIGS. 4(b) and 5, the strip section 42a is fixed to the sleeve 20c with a fixing tool 45 such as a screw.

The first end section 42b is a section like a circular plate arranged in such a manner as to face the side surface of the rotary disk part 41b of the lever 41 described above. A hole for attachment of the bolt 43 is formed at the center of the first end section 42b. The first end section 42b is provided with a protrusion 42c such as that shown in FIG. 6 formed at a side surface of the first end section 42b facing the rotary disk part 41b. The protrusion 42c is formed at a part as viewed in the peripheral direction with respect to the bolt 43 and is engageable with the protrusion 41c of the rotary disk part 41b.

The second end section 42d is arranged in such a manner as to face the first end section 42b. A hole for attachment of the bolt 43 is formed at the center of the second end section 42d. As shown in FIG. 6, etc., the bolt 43 is attached while penetrating the rotary disk part 41b of the lever 41, the first end section 42b, and the second end section 42d. The bolt 43 has a tip where the nut 44 is attached to an external side surface of the second end section 42d. The nut 44 is fixed to the bolt 43 in such a manner that the head of the bolt 43 and the nut 44 are located at a constant interval.

As shown in FIG. 3(a), the control member 40 is placed in the locked state by lifting the lever 41. As shown in FIG. 6(a), in this locked state, the protrusion 41c of the lever 41 lies over the protrusion 42c of the holding member 42 to be engaged with the protrusion 42c. At this time, the protrusion 42c of the holding member 42 is pressed inward with the protrusion 41c of the lever 41 to elastically deform the holding member 42 in a direction of moving the first end section 42b and the second end section 42d of the holding member 42 closer to each other. By doing so, the sleeve 20c is tightened with the strip section 42a to deform the sleeve 20c in the diameter-reducing direction. By this diameter reduction of the sleeve 20c, the slider 34 passed through the interior of the sleeve 20c is held to form a state where the slider 34 is unmovable. As the link mechanism is entirely prohibited from making motion in the state where the slider 34 is unmovable, the second frame 25 also becomes incapable of swinging to fix the angle of the second frame 25.

Figure 7:
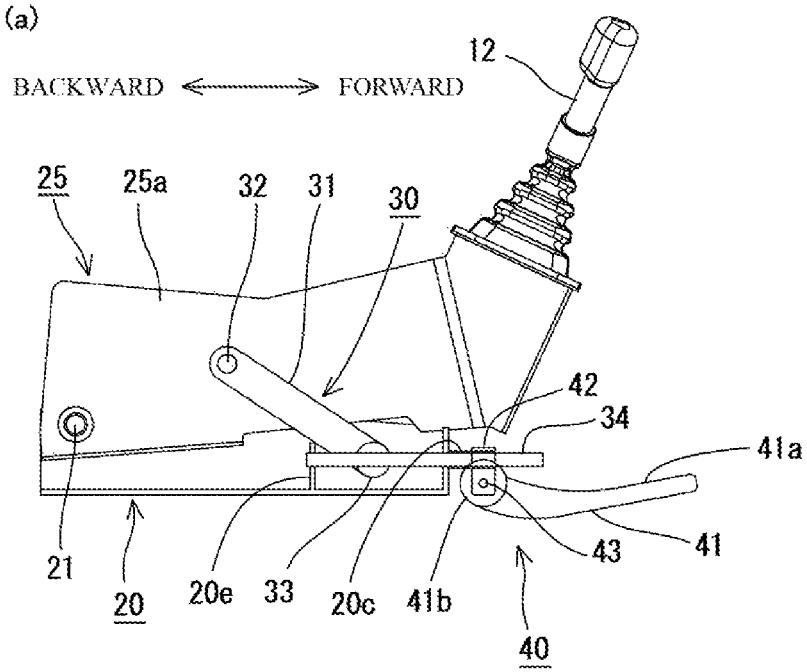
FIG. 7 is a view explaining movement of the link mechanism according to the first embodiment, and includes a view (a) showing a state where a second frame is lowered and a view (b) showing a state where the second frame is lifted.
Figure 7:
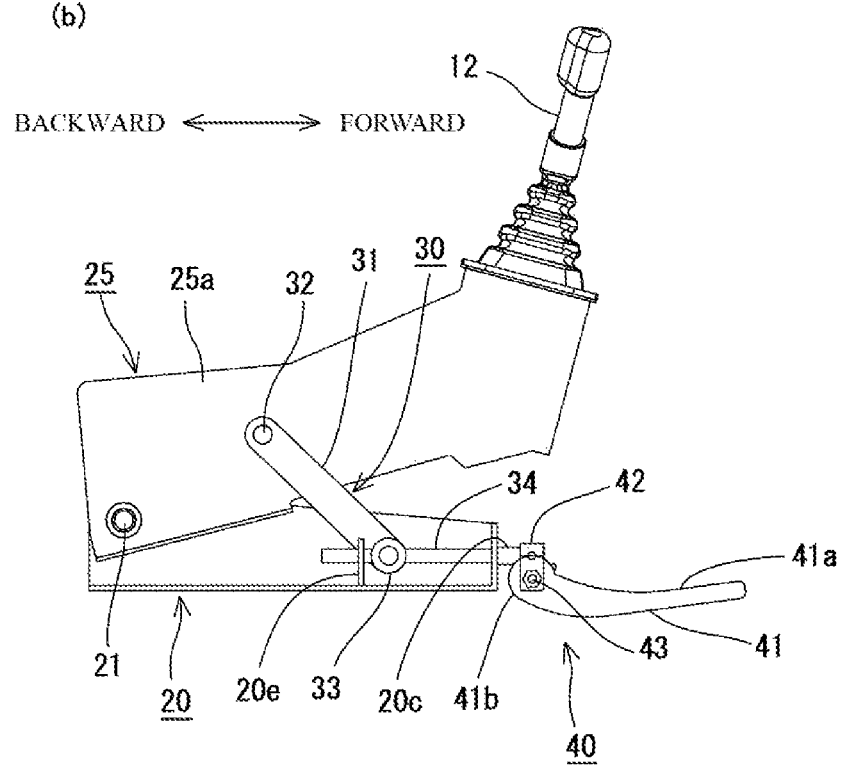

As shown in FIG. 3(b), the control member 40 is brought to the unlocked state by depressing the lever 41. As shown in FIG. 6(b), in the unlocked state, the protrusion 41c of the lever 41 and the protrusion 42c of the holding member 42 are at positions shifted from each other in the peripheral direction with respect to the bolt 43. Thus, the protrusion 42c of the holding member 42 is not pressed inward with the protrusion 41c of the lever 41 so the sleeve 20c is not tightened with the strip section 42a. In this state, the slider 34 passed through the interior of the sleeve 20c is released to allow sliding motion of the slider 34. Thus, as shown in FIG. 7, the second frame 25 becomes capable of swinging.

As described above, according to the present embodiment, the link mechanism composed of three turning pairs and one sliding pair is formed using the first frame 20, the second frame 25, the slider 34, and the connection member 30. Thus, this link mechanism can be used for changing the tilt of the second frame 25. Furthermore, switch can be made between whether to lock motion of the link mechanism and whether to unlock the motion only by controlling the control member 40. Thus, an intention to change the tilt of the second frame 25 can be achieved by controlling the control member 40 to unlock the link mechanism, and an intention to fix the tilt of the second frame 25 can be achieved by controlling the control member 40 to lock motion of the link mechanism. In this way, the tilt of the console 11 can be changed through simple motion and the configuration is simplified.

(Second Embodiment)

A second embodiment of the present invention will be described by referring to FIGS. 8 to 11. In the following description, only a difference from the above-described first embodiment will be explained while explanation of an overlap will be omitted.

Figure 8:
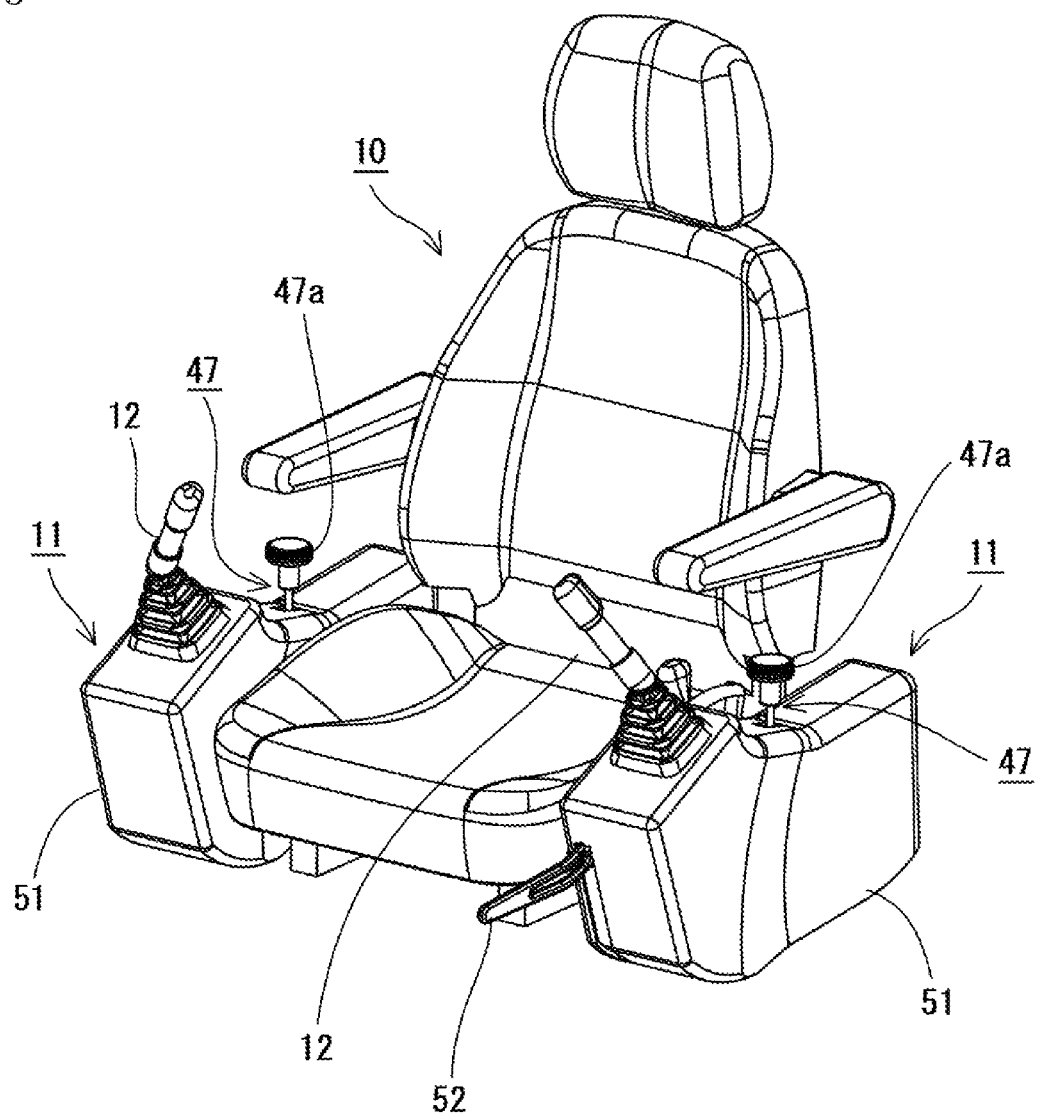
FIG. 8 is a perspective view showing a seat and a console according to a second embodiment.
Figure 9:
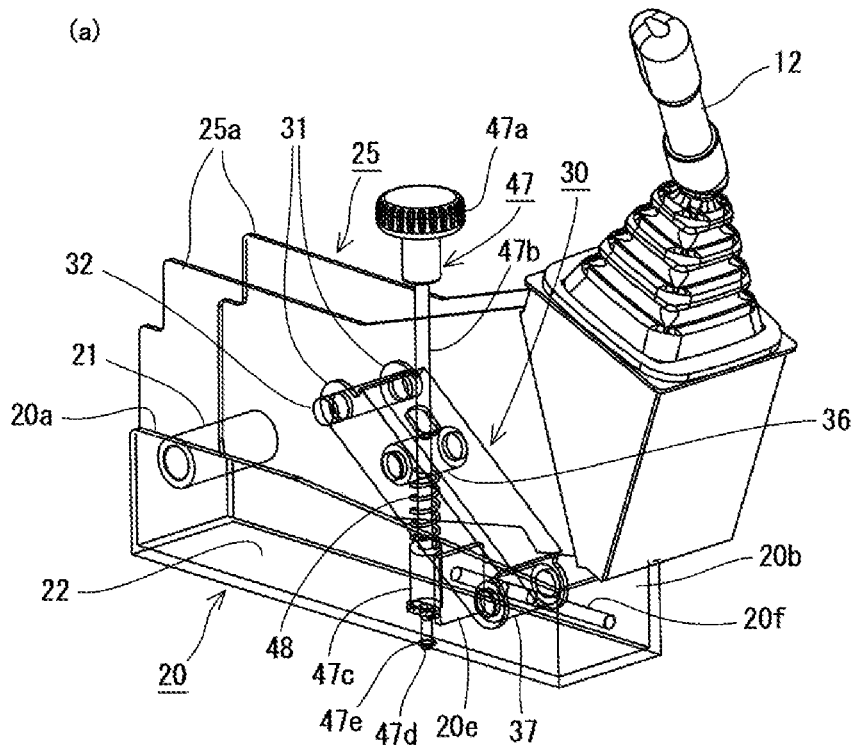
FIG. 9 includes a perspective view (a) explaining the interior of the console, a bottom view b) showing the console, and an enlarged view (c) showing an area A according to the second embodiment.
Figure 9:
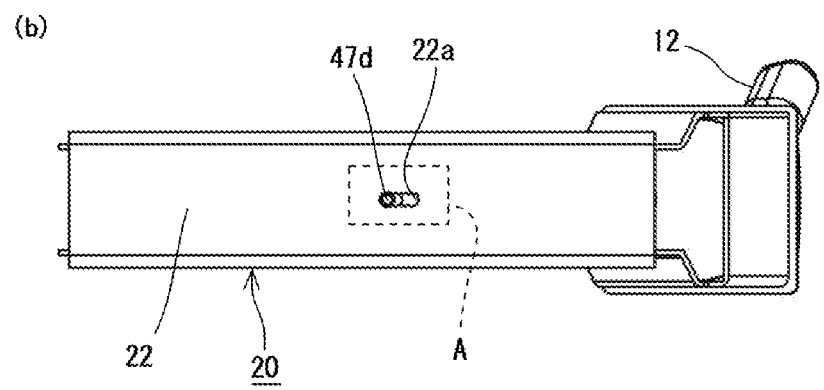
Figure 9:
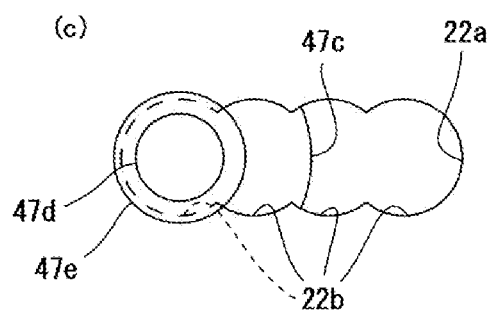

As shown in FIG. 9, etc., a console 11 according to the present embodiment includes a first frame 20, a second frame 25, a connection member 30, a slider 37, and a control member 47. As shown in FIG. 8, these mechanisms are covered with a frame cover 51 so as not to be exposed to the outside except a controllable part.

The first frame 20 is a frame fixed to a lateral part of a seat 10. The first frame 20 is arranged in such a manner as to face a floor surface. The first frame 20 according to the present embodiment includes side plate parts 20a in a pair formed of metallic plates, and a front plate part 20b. The side plate parts 20a in a pair form side surfaces of the first frame 20, and the front plate part 20b forms a front surface of the first frame 20.

A support plate part 20e is provided inside the first frame 20 in such a manner as to face the front plate part 20b. The support plate part 20e is provided in an upright position backward of the front plate part 20b and parallel to the front plate part 20b. A slider guide 20f for guiding sliding motion of the slider 37 described later is provided between the support plate part 20e and the front plate part 20b. The slider guide 20f according to the present embodiment is a shaft member held horizontally backward and forward.

The first frame 20 has a bottom provided with a bottom plate part 22 arranged horizontally. The bottom plate part 22 is given a holding groove 22a such as that shown in FIGS. 9(b) and 9(c). The holding groove 22a is a recess or a hole with which a tip part 47d of the control member 47 described later is to be engaged. The holding groove 22a according to the present embodiment has a shape formed by connecting a plurality of circular holding holes 22b backward and forward in a line.

The second frame 25 is a frame attached to an upper portion of the first frame 20 and arranged in such a manner as to be swingable upward and downward relative to the first frame 20. The second frame 25 according to the present embodiment includes side plate parts 25a in a pair formed of metallic plates. The side plate part 25a of the second frame 25 has a lower end portion arranged in such a manner as to overlap an upper end portion of the side plate part 20a of the first frame 20. A swinging shaft 21 for connecting the side plate parts 20a and 25a while allowing swinging motions of the side plate parts 20a and 25a is provided at a position where the side plate parts 20a and 25a overlap each other at their back portions.

As shown in FIG. 9(a), the connection member 30 is a member having an upper portion connected in a pivotable manner to the second frame 25, and a lower portion connected in a pivotable manner to the slider 37 (described later). The connection member 30 according to the present embodiment is configured by fixing plate-like link member 31 in a pair parallel to each other. The connection member 30 is attached in the vicinity of its upper end portion to the second frame 25 in a pivotable manner through a pivotal shaft 32. The slider 37 described later is attached in a pivotable manner to the vicinity of a lower end portion of the connection member 30.

A control member holder 36 for attachment of the control member 47 described later is provided at an intermediate portion of the connection member 30. The control member holder 36 is a cylindrical member rotatably supported by the link members 31 in a pair. The control member holder 36 is given a through hole 36a for holding the control member 47 slidably described later. The control member 47 is held slidably using the through hole 36a to make the control member 47 slidable upward and downward in a vertical position.

The slider 37 is a member provided in such a manner as to be slidable backward and forward relative to the first frame 20. The slider 37 according to the present embodiment is a circular cylindrical member such as that shown in FIG. 9(a), and is rotatably supported by the link members 31 in a pair forming the connection member 30. The slider 37 is given a guide hole 37a for passing the slider guide 20f described above therethrough. Passing the slider guide 20f through the guide hole 37a makes the slider 37 slidable backward and forward in a direction of the length of the slider guide 20f.

Figure 10:
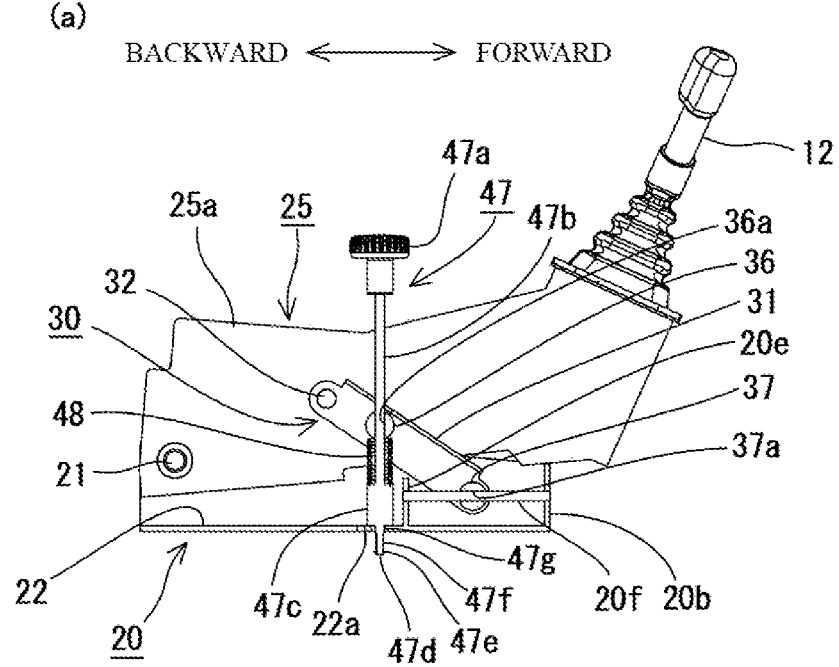
FIG. 10 is a view explaining movement of the console according to the second embodiment, and includes a view (a) showing a state where motion of a link mechanism is locked and a view (b) showing a state where the link mechanism is unlocked.
Figure 10:
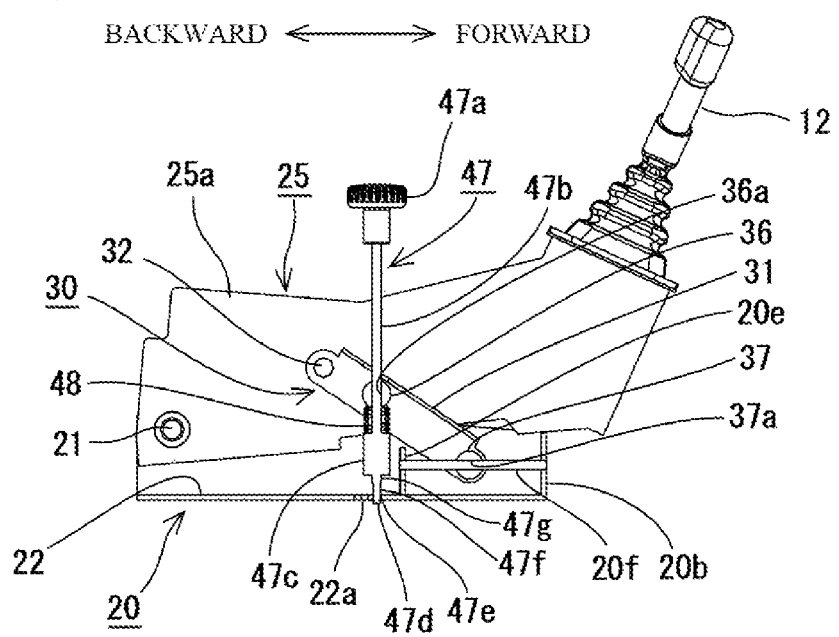
Figure 11:
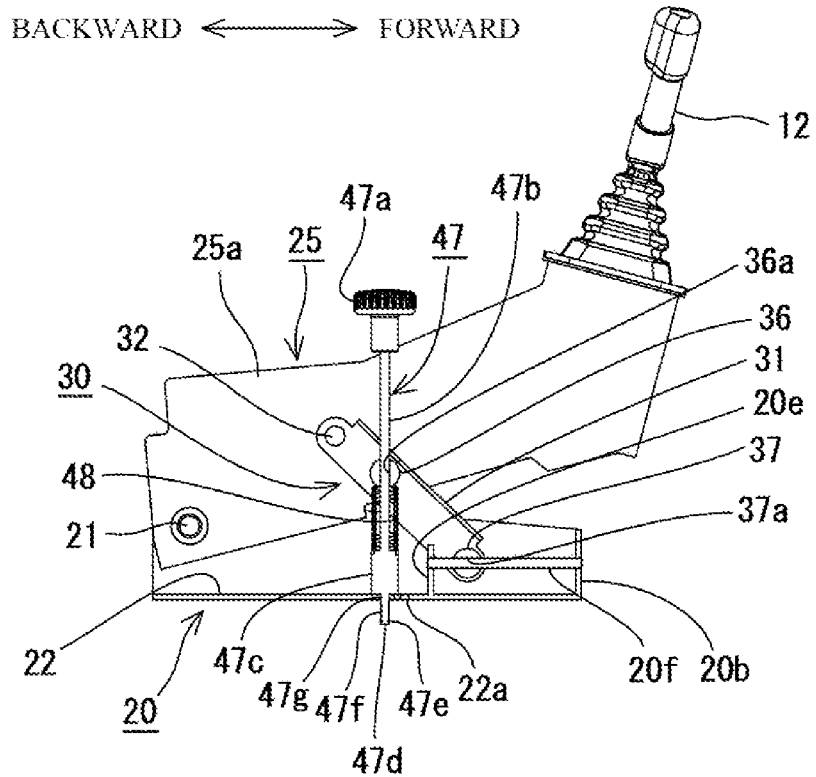
FIG. 11 is a view explaining movement of the console according to the second embodiment and showing a state where motion of the link mechanism is locked by changing the tilt of a second frame.

In the tilt structure according to the present embodiment, the above-described four links (first frame 20, second frame 25, connection member 30, slider 37) form a link mechanism composed of three turning pairs and one sliding pair. Specifically, a joint between the first frame 20 and the second frame 25, a joint between the second frame 25 and the connection member 30, and a joint between the connection member 30 and the slider 37 correspond to the turning pairs. A joint between the first frame 20 and the slider 37 corresponds to the sliding pair. As a result, when the second frame 25 swings relative to the first frame 20 as a fixed link, the connection member 30 swings accordingly to cause the slider 37 to slide. More specifically, as shown in FIG. 10(a), when the second frame 25 swings downward, the connection member 30 swings downward to cause the slider 37 to slide forward. As shown in FIG. 11, when the second frame 25 swings upward, the connection member 30 swings upward to cause the slider 37 to slide backward.

The control member 47 is a member provided controllably in order to fix or unfix the tilt of the second frame 25. The control member 47 is provided controllably in order to lock or unlock motion of the above-described link mechanism. More specifically, the control member 47 according to the present embodiment is configured to be placeable in a locked state of restricting movement of the connection member 30 and an unlocked state of releasing the connection member 30 to make the connection member 30 movable.

The control member 47 is a rod-like member to be controlled by an operator in changing the tilt of the console 11 and is attached to the control member holder 36 in such a manner as to be slidable upward and downward. The control member 47 is always biased downward by a spring 48. As shown in FIGS. 9(a), 10, etc., the control member 47 according to the present embodiment includes a grip 47a and a shaft part 47b.

The grip 47a is provided at the vicinity of the upper end of the control member 47 and is exposed to the outside of the frame cover 51 for allowing control by an operator. The grip 47a according to the present embodiment is formed as a circular handle for axially rotating the control member 47.

The shaft part 47b is a rod-like part of the control member 47 extending downward and is arranged to penetrate the above-described control member holder 36. The shaft part 47b has a lower end where the tip part 47d engageable with the holding groove 22a of the bottom plate part 22 is formed. The tip part 47d according to the present embodiment penetrates the holding groove 22a and a lower side of the tip part 47d passed through the holding groove 22a is provided with a flange part 47e. The flange part 47e is formed into a greater width than the holding groove 22a and functions as a retainer for preventing the tip part 47d from pulling out upward from the holding groove 22a.

The shaft part 47b on the flange part 47e is formed to have diameters changing stepwise. More specifically, the shaft part 47b includes a small-diameter part 47f formed directly on the flange part 47e, a large-diameter part 47g formed on the small-diameter part 47f, and a bulging part 47c formed still on the large-diameter part 47g. The small-diameter part 47f is formed into a smaller diameter than the minimum width of the holding groove 22a. While the small-diameter part 47f faces the holding groove 22a, the shaft part 47b is movable between a plurality of the holding holes 22b. The large-diameter part 47g is formed into a diameter greater than the minimum width of the holding groove 22a and less than that of the holding hole 22b (or into a diameter to provide precise fit in the holding hole 22b). While the large-diameter part 47g faces the holding groove 22a, the shaft part 47b is unmovable between a plurality of the holding holes 22b (latched in the holding hole 22b). The bulging part 47c is formed into a greater diameter than the holding groove 22a or the holding hole 22b to be prevented from getting into the holding groove 22a.

Thus, as shown in FIG. 10(a), the control member 47 is lowered downward in a natural state by the biasing force of the spring 48 and the self weight of the control member 47. In this state, the shaft part 47b is depressed downward to a position where the lower surface of the bulging part 47c abuts on the bottom plate part 22. Furthermore, the large-diameter part 47g of the shaft part 47b is fitted and fixed to any of a plurality of the holding holes 22b. This state corresponds to the locked state. As the control member 47 is unmovable backward and forward in this locked state, backward and forward movement of the control member holder 36 is restricted to restrict movement of the connection member 30. Restricting movement of the connection member 30 prohibits motion of the link mechanism as a whole to prohibit swinging motion of the second frame 25, thereby fixing the angle of the second frame 25.

On the other hand, when the control member 47 is lifted to a position where the small-diameter part 47f is placed at the height of the holding groove 22a as shown in FIG. 10(b), the control member 47 becomes movable backward and forward in a direction of the length of the holding groove 22a. This state corresponds to the unlocked state. As the control member 47 is movable backward and forward in this unlocked state, the control member holder 36 becomes movable backward and forward to allow movement of the connection member 30. Allowing movement of the connection member 30 in this way makes the second frame 25 swingable.

An intention to change the angle of the second frame 25 can be achieved by lifting the control member 47 to form the unlocked state, lifting the second frame 25 in this unlocked state to a predetermined angle, and then releasing the lifted control member 47. As shown in FIG. 11, as a result of this motion, the control member 47 is placed in the locked state at a position where the control member 47 is released to allow the angle of the second frame 25 to be fixed.

As described above, according to the present embodiment, the link mechanism composed of three turning pairs and one sliding pair is formed using the first frame 20, the second frame 25, the slider 37, and the connection member 30. Thus, this link mechanism can be used for changing the tilt of the second frame 25. Furthermore, switch can be made between whether to lock motion of the link mechanism and whether to unlock the motion only by controlling the control member 47. Thus, an intention to change the tilt of the second frame 25 can be achieved by controlling the control member 47 to unlock the link mechanism, and an intention to fix the tilt of the second frame 25 can be achieved by controlling the control member 47 to lock motion of the lurk mechanism. In this way, the tilt of the console 11 can be changed through simple motion and the configuration is simplified.

Figure 12:
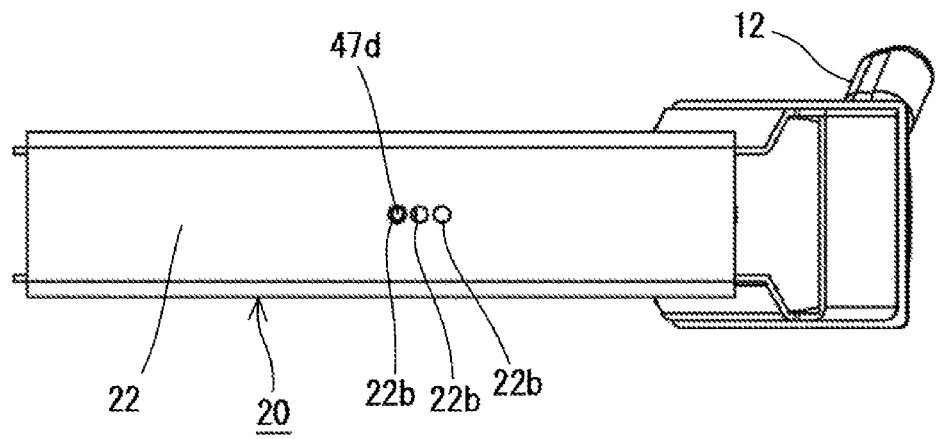
FIG. 12 is a bottom view of a console according to a modification of the second embodiment.

In the present embodiment, for engagement of the tip part 47d of the control member 47, the holding groove 22a with a plurality of the circular holding holes 22b connected in a line is provided. However, this is not the only formation but the holding holes 22b may be formed independently of each other as shown in FIG. 12. In this case, the tip part 47d of the control member 47 is inserted into the holding hole 22b in the locked state, and the tip part 47d of the control member 47 is pulled out of the holding hole 22b in the unlocked state. This modification can also achieve effect comparable to that of the above-described embodiment.

Reference Signs List

10 Seat
11 Console
12 Operation lever
20 First frame
20a Side plate part
20b Front plate part
20c Sleeve
20d Slit
20e Support plate part
20f Slider guide
21 Swinging shaft
22 Bottom plate part
22a Holding groove
22b Holding hole
25 Second frame
25a Side plate part
30 Connection member
31 Link member
32 Pivotal shaft
33 Slider holder
33a Attachment hole
34 Slider
36 Control member holder
36a Through hole
37 Slider
37a Guide hole
40 Control member
41 Lever
41a Grip
41b Rotary disk part
41c Protrusion
42 Holding member
42a Strip section
42b First end section
42c Protrusion
42d Second end section
43 Bolt
44 Nut
45 Fixing tool
47 Control member
47a Grip
47b Shaft part
47c Bulging part
47d Tip part
47e Flange part
47f Small-diameter part
47g Large-diameter part
48 Spring
51 Frame cover
52 Gate lever

The invention claimed is:
1. A tilt structure to change the tilt of a console arranged at a lateral part of a seat, comprising:
a first frame arranged at the lateral part of the seat;
a second frame attached to an upper portion of the first frame in such a manner as to be swingable upward and downward;
a slider provided in such a manner as to be slidable backward and forward relative to the first frame;
a connection member connected in a pivotable manner to the second frame and the slider; and a control member for fixing or unfixing the tilt of the second frame, wherein a link mechanism composed of three turning pairs and one sliding pair is formed using the second frame, the first frame, the slider, and the connection member, and the control member is provided controllably in order to lock or unlock motion of the link mechanism.

2. The tilt structure for a console according to claim 1, wherein the control member is configured to be placeable in a locked state of holding the slider in such a manner as to make the slider unmovable and an unlocked state of releasing the slider to make the slider movable.

3. The tilt structure for a console according to claim 1, wherein the control member is configured to be placeable in a locked state of restricting movement of the connection member and an unlocked state of releasing the connection member to make the connection member movable.

* * * * *